(12) United States Patent
Gravelle et al.

(10) Patent No.: US 8,779,968 B2
(45) Date of Patent: Jul. 15, 2014

(54) SYSTEM AND METHOD FOR MICROWAVE RANGING TO A TARGET IN PRESENCE OF CLUTTER AND MULTI-PATH EFFECTS

(75) Inventors: Kelly Gravelle, Poway, CA (US);
Jeremy Landt, Santa Fe, NM (US);
Joseph H. Kao, Albuquerque, NM (US);
Michael P. Gonzales, Albuquerque, NM (US)

(73) Assignee: Amtech Systems, LLC, Albuquerque, NM (US)

( * ) Notice: Subject to any disclaimer, the term of this patent is extended or adjusted under 35 U.S.C. 154(b) by 659 days.

(21) Appl. No.: 13/095,296

(22) Filed: Apr. 27, 2011

(65) Prior Publication Data
US 2011/0260910 A1    Oct. 27, 2011

Related U.S. Application Data

(60) Provisional application No. 61/328,457, filed on Apr. 27, 2010, provisional application No. 61/355,824, filed on Jun. 17, 2010.

(51) Int. Cl.
*G01S 13/32* (2006.01)
*G01S 13/76* (2006.01)
*G01S 13/75* (2006.01)
*G01S 7/02* (2006.01)

(52) U.S. Cl.
CPC ............ *G01S 13/765* (2013.01); *G01S 13/751* (2013.01); *G01S 7/023* (2013.01)
USPC ............................ 342/42; 342/130; 340/10.1

(58) Field of Classification Search
USPC ......................................................... 342/125
See application file for complete search history.

(56) References Cited

U.S. PATENT DOCUMENTS

| | | | | |
|---|---|---|---|---|
| 6,476,756 | B2 | 11/2002 | Landt | |
| 6,492,933 | B1 * | 12/2002 | McEwan | 342/28 |
| 6,600,443 | B2 | 7/2003 | Landt | |
| 2012/0268308 | A1 * | 10/2012 | Tuttle | 342/42 |

* cited by examiner

*Primary Examiner* — Matthew M Barker
(74) *Attorney, Agent, or Firm* — Caesar, Rivise, Bernstein, Cohen & Pokotilow, Ltd.

(57) ABSTRACT

A system for measuring the range to an RFID tag including situations containing high clutter and multi-path signals is disclosed. The system includes an RFID reader; an RFID tag; and a coordinated pulse radar system. In the system the RFID reader causes the tag to respond to received signals in a first backscatter state at a first time and a second backscatter state at a second time. The pulsed radar system transmits short pulses coordinated by the backscatter state of the RFID tag and the system creates a differential signal comprised of the differences between radar signals obtained during the first and second states of the tag to obtain an uncorrupted measure of a round trip time of flight of said radar pulses between the pulse radar system and the RFID tag.

15 Claims, 5 Drawing Sheets

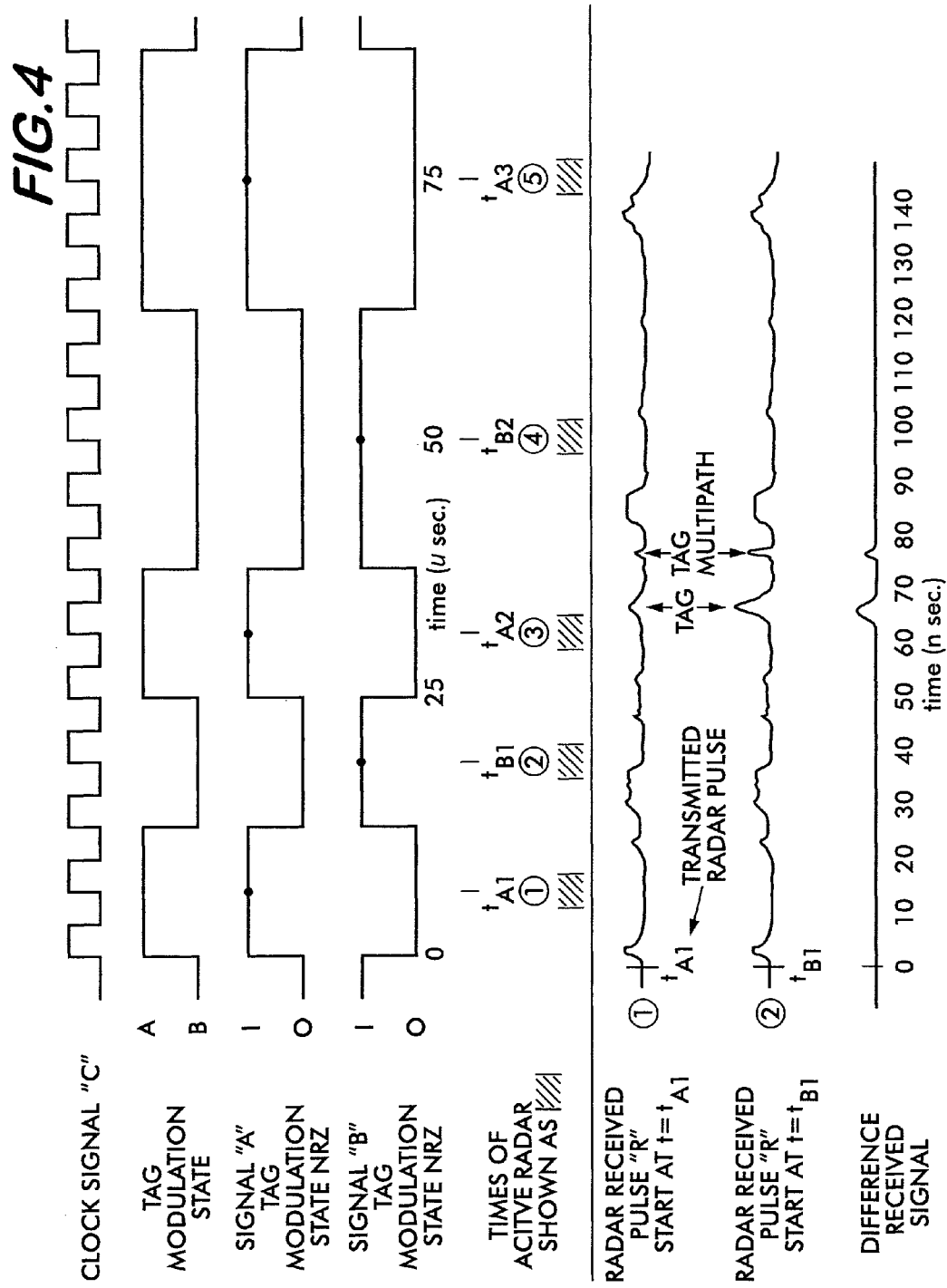

SYSTEM AND METHOD FOR MICROWAVE RANGING TO A TARGET IN PRESENCE OF CLUTTER AND MULTI-PATH EFFECTS

CROSS-REFERENCE TO RELATED APPLICATIONS

This utility application claims the benefit under 35 U.S.C. §119(e) of Provisional Application Ser. No. 61/328,457 filed on Apr. 27, 2010 and Provisional Application Ser. No. 61/355,824, filed on Jun. 17, 2010, both entitled System and Method for Microwave Ranging to a Target in Presence of Clutter and Multi-path Effects. The entire disclosures of these provisional applications are incorporated by reference herein.

FIELD OF INVENTION

This invention relates to the field of electromagnetic distance measurement and, in particular, distance measurement to an RFID device.

BACKGROUND OF THE INVENTION

A pulsed radar system may be used to measure the distance to a target using the round-trip time of flight of the radar signal. The one-way distance, d, to the target is computed from the equation $2d=t*c$ where c is the velocity of light and where t is the time between the transmitted pulse and received pulse reflected from the target. Radar technology is well developed. However, an individual target may be difficult to isolate if there are many reflectors in the field of the radar. Also, the distance calculation may be corrupted by multi-path effects. Multi-path effects may be mitigated by using the time of the first return pulse from the target instead of the strongest return. However, this technique is fraught with problems if the reflected signal from the target is corrupted from signals reflected from other objects in the field of the radar system. RFID systems are well known in the art and are used to monitor objects and places by attaching a tag to objects and places to be monitored. These objects may be large and in the presence of many other reflecting objects. Backscatter RFID systems use CW signals, and thus lack the capability of ranging using pulsed signals. The phase of the backscattered signals from a modulated backscatter tag can be used to calculate the distance to a tag, as disclosed in provisional application Ser. No. 61/299,474 filed Jan. 29, 2010. In that system, accuracy may degrade severely in a highly reflecting environment due to multi-path effects. Time-of-flight methods to determine tag location may be found in the art. Most, if not all, of these are expensive and require careful installation, precisely locating the radar systems.

Many tens of millions of tags are presently in use. An object of the present invention is to enable ranging to tags that are already in use. Another object of the present invention is to determine the distance to a tag with an accuracy of one meter or better.

The present invention overcomes these difficulties and allows measurement of the distance to a modulated backscatter RFID tag in the presence of clutter and multi-path. The technique can be applied to other radar systems using the principles described below.

A modulated backscatter RFID tag transfers data from its memory to a remote reader by modulating the backscatter cross section of the tag antenna in a coded fashion, changing at a minimum from one reflecting state to another reflecting state (or between several reflecting states). A continuous wave (CW) radio signal is transmitted toward the tag by a reader. The tag modulates the reflected wave sent back to the reader. The reader then receives and decodes the modulated signal from the tag to extract the information sent by the tag. The decoding process recovers the timing of the modulation states of the tag. These timings cannot be used for ranging since there is no absolute time base to establish a reference time for ranging. (The art includes measuring the timing of pulses transmitted by a tag by several readers and calculating tag location using differences in timing between readers. This solution is complicated, expensive and inconvenient.) Also a practical problem is that the transitions from one state to the other lack the precision and definition in timing required for the nanosecond resolution required for ranging. For example, a resolution of 1 meter in tag location requires a timing resolution of 7 nanoseconds or better.

An example of the geometry of a conventional pulsed radar system is shown in FIG. 1. The radar system transmits a short pulse of RF signal which is reflected from the objects in the field of the radar and are received by the radar system. Strong multi-path signals may occur from a radio path bounced from the radar system to a flat surface (ground for example), to targets, and return. A sample plot of signals is shown in FIG. 2. The problem is to determine the time of the correct pulse of the many in FIG. 2.

All references cited herein are incorporated herein by reference in their entireties.

BRIEF SUMMARY OF THE INVENTION

In an embodiment of the invention, there is a system for measuring the range to an RFID tag including situations containing high clutter and multi-path signals, is disclosed. The system includes an RFID reader; an RFID tag; and a coordinated pulse radar system. In the system, the RFID reader causes the tag to respond to received signals in a first backscatter state at a first time and a second backscatter state at a second time. The pulsed radar system transmits short pulses coordinated by the backscatter state of the RFID tag and the system creates a differential signal comprised of the differences between radar signals obtained during the first and second states of the tag to obtain an uncorrupted measure of a round trip time of flight of the radar pulses between the pulse radar system and the RFID tag.

BRIEF DESCRIPTION OF SEVERAL VIEWS OF THE DRAWINGS

FIG. 4. is a diagram of several signals produced by the systems shown in FIGS. 3 and 3a.

DETAILED DESCRIPTION OF PREFERRED EMBODIMENTS OF THE INVENTION

Figure 1:
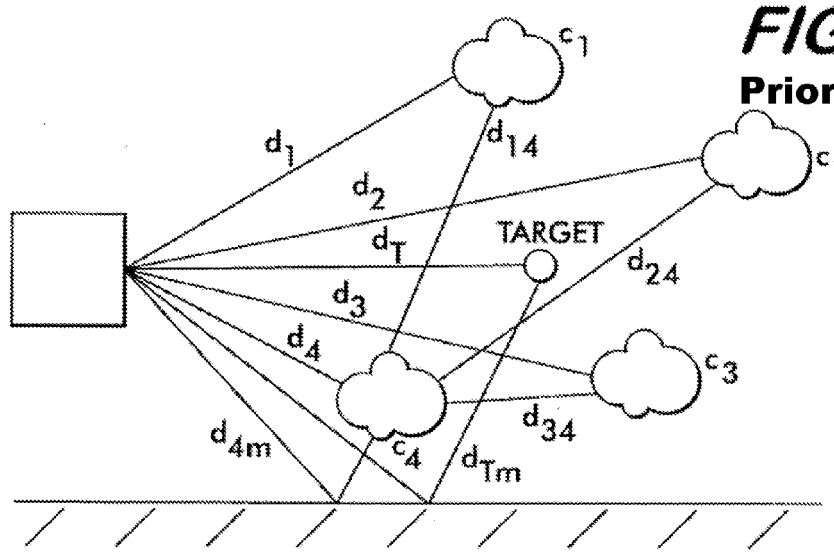
FIG. 1. is a diagram of a pulsed radar system.
Figure 2:
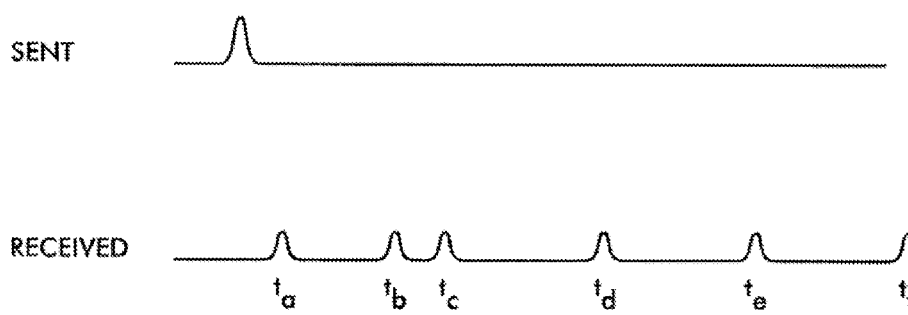
FIG. 2. is a diagram of envelopes of radar pulses of the system of FIG. 1.
Figure 3:
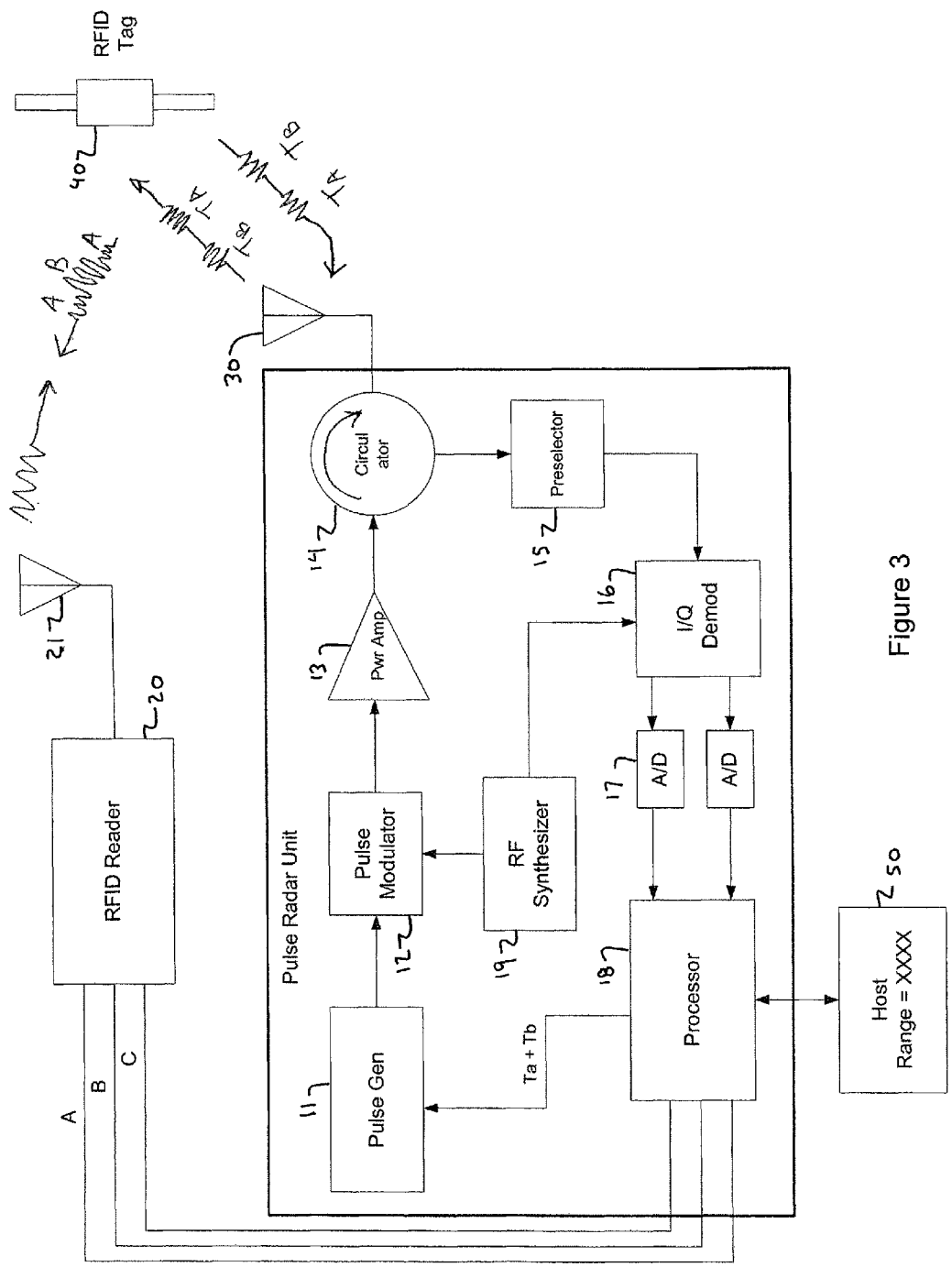
FIG. 3 is a diagram of an embodiment of a ranging system for modulated backscattered tags.

The system of the present invention is shown in FIG. 3. Clutter and multipath of FIG. 1 are not shown in FIG. 3 for clarity and to simplify the explanation of the operation of the invention. The timing of the modulation states of the tag are shown in FIG. 4. The signals of the system of FIG. 3 are also shown in FIG. 4.

The system operates in the following manner:

The RFID reader 20 and RFID tag 40 shown in FIG. 3 operate in the normal fashion. During times that the RFID reader 20 is sending continuous wave (CW) signals to the tag 40, and the tag is simultaneously changing modulation states, the pulsed radar system 10 sends short pulses of RF signals to the tag at coordinated times. On occasion, the RFID reader may send modulated signals to the tag to control tag operation and send data to the tag. During these times, the pulsed radar system is not required to transmit pulses since the tag may not be modulating. While the RF carrier frequencies of the two systems may be the exactly same, there are significant advantages if the RF carrier frequencies of the two systems are different from each other. The RF frequencies of the RFID system and the radar system may be in the same RF band or may be in different RF bands. For example, the RFID frequency may be 911 MHz and the radar frequency may be 10 GHz. A requirement is that the tag modulate its backscatter cross section simultaneously and with synchronized timing in the two bands. Some tags in present use may require that the RF frequencies of the two systems be in the same band, but this is a practical limitation, not a fundamental limitation.

The RFID reader decodes the information from the tag and produces a clock signal and signals indicating the state of modulation of the tag that are synchronized. The clock signal may be generated in the tag and recovered by the reader, or the reader may control the clock signal. Both of these methods and others are compatible with the present invention. The requirement is that the radar system know the modulation state of the tag. The RFID reader decodes the modulation state to recover the data sent by the tag. The RFID reader also sends the clock and modulation state signals to the pulsed radar system to be used for timing via signal lines A, B and C. An example of a "Clock Signal" of 160 kHz is shown in FIG. 4. The clock signal is derived from the timing of the modulation received from the tag. The reader decodes the TAG MODULATION STATE which is shown in FIG. 4. The reader produces a signal to indicate when the tag is in "STATE A" and an additional signal to indicate when the tag is in "STATE B". These signals are shown in FIG. 4. The reader sends these signals to the pulsed radar and processing sections 10 of the system as shown in FIG. 3. The signals sent from the RFID Reader to the pulsed radar system may be of normal bandwidth and jitter for signals in the RFID system. High bandwidth and low jitter is only required for the radar pulse ranging signals shown in the lower part of FIG. 4 where the time scale is measured in nanoseconds.

The pulsed radar and processing section 10 comprises a processor 18 for controlling the operation of the pulsed radar transmitter and for processing radar signals received. The pulsed radar transmitter includes a pulse generator 11 under the control of the processor 18, a pulse modulator 12, and RF synthesizer 19 and a power amplifier 13. In an embodiment, shown in FIG. 3, the output signal of the power amplifier 13 goes through a circulator 14, which is connected to antenna 30, which also receives return signals. hi another embodiment, shown in FIG. 3a, the output signal of the power amplifier 13 goes directly to antenna 30. In the embodiment shown in FIG. 3a, the radar return signal is received at a separate antenna 31. In both embodiments, the received signal goes through preselector 15 and then to I/Q demodulator 16. The demodulated signal is converted to a digital form by one or more analog to digital convertors 17. The processor 18 receives the digitized signals from the A/D convertors 17 and processes the received signals as described herein.

The pulsed radar system 10 transmits a ranging pulse to the tag during a convenient time when the tag is in modulation State A (example of the time labeled tA1), and receives the return signals producing an output signal VA (labeled with the circled numeral 1, see FIG. 4). Subsequently, the pulsed radar system transmits a ranging pulse to the tag during a convenient time when the tag is in modulation State B (example of the time labeled tB1, and receives the return signals producing an output signal VB (labeled with the circled numeral 2, see FIG. 4). A difference signal is produced by subtracting VA from VB (or vice versa) producing output signal V3=VB−VA (shown as "DIFFERENCE RECEIVED SIGNAL" in FIG. 4). The timings of signals VB and VA are referenced to the time of the transmission of each individual RF pulse transmitted by the radar. Thus, in the example, the timing of signal VA is delayed. The delay may be accomplished, for example, by sampling the signal and storing in a shift register. Accurate, low jitter and repeatable timing is only required referenced to the particular transmitted radar pulse for that ping. Alternately, a delay line such as a SAW delay line could be used to delay the radar return signal from one tag state to another for direct subtraction. This option requires nanosecond accuracy in delay and launch of the second transmitted radar pulse (B) referenced from the time the first transmitted radar pulse (A). A short time lapses between the signals VA and VB. Thus, the only difference in the targets in the field of the radar system is the modulation state of the tag and V3 contains only a pulse (or pulses) arising from the difference in modulation state of the tag. The time of the first pulse observed in the difference signal V3 is due to the direct (shortest) distance between the radar system and the tag. Latter pulses are due to multi-path, as shown in FIG. 4. In this example, the round trip travel time of the radar pulse to the tag and return is 65 nanoseconds, which corresponds to a one-way distance of 9.8 meters between the pulsed radar and the tag. The system may be calibrated to remove constant distances such as the lengths of coaxial cables and the like in the pulsed radar system. The difference signals may be accumulated, averaged, or otherwise processed to improve signal to noise and resolution of timing.

Thus, the distance to the tag is found in the presence of clutter and multi-path.

Figure 3A:
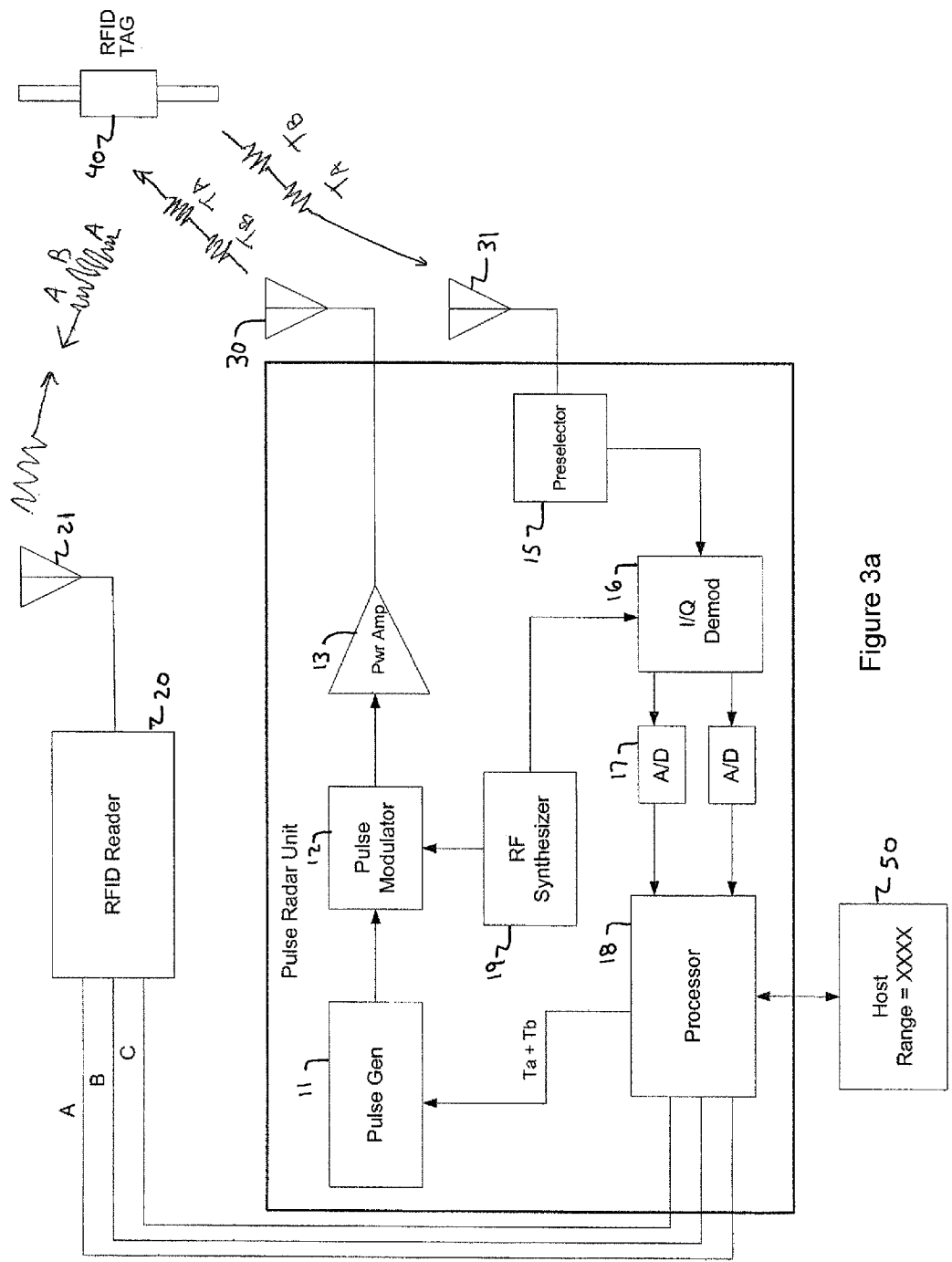
FIG. 3a is a diagram of a further embodiment of a ranging system for modulated backscattered tags.

Elimination of clutter relies on subtraction of radar signals obtained at slightly different times in quick succession. Since the signal from the tag can be small with respect to other signals, improved performance is possible if stray signals are minimized or eliminated. FIG. 3 shows a monostatic radar system that uses a circulator 14 to separate transmitted and received radar signals. Circulators have a substantial leakage that is much larger than the signal from the tag. This leakage may be at a different time from the transmitted short pulse of the invention or overlap the received radar signal and is problematic (saturates amplifiers, etc.). Improved performance may be obtainable with a bistatic system without a circulator as shown in FIG. 3a. One antenna 30 is used for transmit and another antenna 31 is used for receive. Thus, the signals entering the receiver originate only from signals reflected from the environment or cross-talk, which can be minimized by antenna design.

In a further embodiment to address the low amplitude of the return signal, if a short radar pulse is transmitted, it could be ended before the returns arrive. The residual signals from the transmitter could be clamped to a level small enough to be below the return from the tag.

In a further embodiment, in the system of FIG. 3, the receiver is blanked during the transmit pulse, assuming the transmitted and received pulses do not overlap. In this embodiment, the off level of the transmitter must be very low. The radar return from the tag is likely to be 50 db less than the transmitted pulse. Thus, for blanking to be effective, the circulator isolation plus the level of blanking must be on the same order.

The power received in a radar system varies inversely as the fourth power of the distance to the source. Thus, a very wide dynamic range is required to accommodate tags that span the operable range of distances between the reader and the tag. One way to accommodate this wide range is to have a parallel bank of amplifiers and A/D converters following the I/Q demodulator that overlap in gain to provide the overall dynamic range required. Dynamic control of amplifier gains is undesirable in this system, since the response of the system must be exactly the same for each received radar pulse to be able to use subtraction to eliminate signals that do not originate with tag modulation. The requirement is to amplify the signal sufficiently for processing without compressing the signal so that the tag signal is not lost due to compression. In an embodiment, this is achieved by having a bank of amplifiers, where the output of the one that has the largest uncompressed output is used.

If A/D converters are used (as shown in embodiments in FIGS. 3 and 3a), they must have high resolution and a rapid sampling rate with little timing jitter to allow the precise alignment in timing from one returned signal to the next so that the subtraction results in elimination of clutter. Because the returned tag signal is very small compared with the unmodulated background, any error in timing is catastrophic, and the difference between the subtraction of the state A and state B returned signals may be so small as to not be measurable. The details depend on variable such as radar pulse width, but if there is jitter, the timing between signals can be processed assuming a varying delay time. Since the unmodulated return signal is very large (but also is a function of time delay), then the lowest error in timing is when the subtraction results in a minimum signal, with the remaining small signal due to the tag. The signals resulting from clutter will commonly be much larger than the signals from a tag, so it could be possible to make the adjustments in timing automatically adjustable, so that the subtraction of signals of one modulation state from another results in a minimum signal, with the remaining signal due to the tag. For example: a return that has three clutter pulses and one tag pulse. If the timing is correct, the subtracted signal will have only one pulse due to the tag if there is no multipath. If the timing is not lined up correctly, there will be more that one pulse, perhaps eight in this example.

Elimination of clutter relies on subtraction of large signals obtained at different times for different transmitted radar pulses. Thus, the transmitted radar pulses at each time must be exactly the same, so the returns from clutter will subtract to zero. In a further embodiment, to accommodate radar pulses that vary slightly, each transmitted radar pulse is measured and the corresponding radar return signal is normalized. The signals can be measured anywhere in the system, but could be measured just prior to subtraction (after reception, demodulation, filtering, amplification, etc.). In a further embodiment the adjustment is performed automatically by minimizing the differential signal by adjusting the level of return signals. For example, if the transmitted radar pulse for tag modulation state A is 1.000, and for state B is 0.999, then the subtraction for stationary targets produces a signal of 0.001 which still might be much larger than the tag signal. Thus, in this case of the signal received for state B is amplified slightly more than for state A, the difference could be adjusted to 0.000 (in which the tag signal would be a larger portion).

Radio regulations govern the spectral mask that can be used (along with modulation types, power levels, duty cycles, antenna gains, etc.). The narrower the bandwidth, the wider and slower rise and fall times of the pulse, and the lower resolution in timing. The time width of the pulse is limited by the modulation frequency (subcarrier, etc.) between modulation states of the tag. Fast radar pulses increase resolution and are easier to stay within the modulation states of the tag, but require more bandwidth, and are therefore more difficult to operate within regulatory requirements. Thus the practical implementation is influenced by regulatory requirements. The most demanding limitation is the balance between occupied bandwidth and timing resolution. Accommodation of this limitation is one of the reasons to use separate bands for the normal operation of the RFID system (perhaps in the 915 MHz band) and the radar ranging system (perhaps in the 2.45 or 5.8 GHz bands). In further embodiments, other methods of limiting bandwidth include using low power, pulse shaping and low duty cycle.

Thus, because only 26 MHz of bandwidth is allowed under F.C.C. Part 15 rules in the 902-928 MHz band, more resolution may be achieved by using radar pulses at another frequency, in the 2450 MHz band, for example.

Multiple tags in the field may be located by several ways. If the system uses tags that can be controlled, then all tags can be commanded to be silent except for the desired tag. If several tags are in the field and cannot be commanded on or off, then the difference signal V3 may be averaged. Only the modulation of the desired tag that is read will be in synchronous with the radar pulses. The radar return signals from tags other than the desired tag will diminish with averaging since these other signals will occur at random times.

The pulsed radar system may operate with higher bandwidth and lower power than the RFID system to provide the required bandwidth needed for timing and also to comply with regulatory requirements.

The invention may be applied to other applications and implementations. For example, a simple target switching between modulation states may be used in place of the tag, a new tag may use a second channel at a much different frequency than the RFID system (RFID at 911 MHz, pulsed system at 5.8 GHz), and other implementations employing the methods of this invention.

Figure 5:
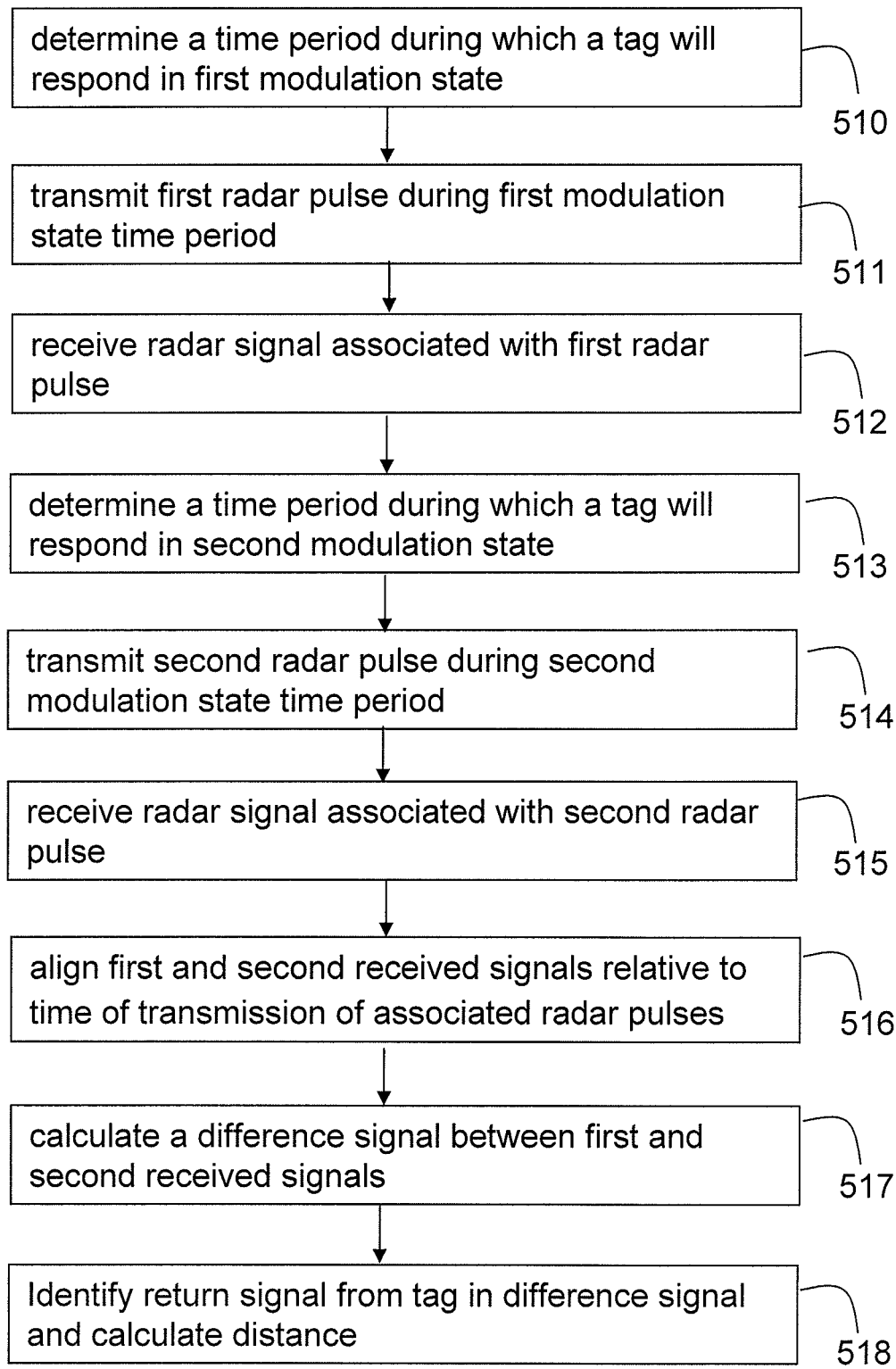
FIG. 5. is a flow diagram of an exemplary process for determining the distance between an RFID tag and a tag reader in the presence of clutter or multi-path signals.

FIG. 5 shows the process steps for an exemplary method for determining the distance between an RFID tag and a tag reader in the presence of clutter or multi-path signals. The process begins at step 510 wherein a time period during which a tag will respond in a first modulation state is determined. At step 511, a first radar pulse is transmitted at a first pulse time during the first modulation state time period. At step 512, a signal is received that is associated with the first radar pulse. At step 513, a time period is determined during which the tag will respond in a second modulation state. At step 514, a second radar pulse is transmitted at a second pulse time during the second modulation state time period. At step 515, a signal is received that is associated with the second radar pulse. At step 516, the first and second received signals are aligned relative to the time of transmission of transmitted radar pulses with which the respective received signals is associated. At step 517, a difference signal is calculated between the aligned first and second received signals. At step 518, a return signal associated with the tag is identified in the difference signal and the distance between the tag and the reader is calculated based on the amount of time between the return signal and the transmission of the radar pulses.

In another application, the location of the tag can be found using a plurality of radar systems using triangulation, or by using a pulsed radar for distance and an angle of arrival measurement for direction to the tag. Examples of this practice are found in U.S. Pat. Nos. 6,476,756 and 6,600,443. In a further embodiment, the location of a tag is determined using the systems and methods disclosed herein. In an embodiment, a plurality of pulsed radars are implemented by multiple coordinated individual radar units, or by a radar system using a single transmitted pulse and receivers at multiple positions to measure timing of return pulses for each modulation state, with coordination with the modulation state of the tag, and timing for each receiver aligned within the requirement for timing accuracy (by wire or GPS, etc.)

In applications such as toll collection, the precise location of a tag is not needed, only that the tag is within a certain region. This can be accomplished by using the methods of the previous paragraph above, with limits set on each distance or direction measurement to be "within" or "outside" of the region of interest. The tag (on a vehicle for example) is in the desired area only when none of the location measurements indicate that the tag is "outside" the desired area.

Those skilled in the art will recognize other detailed designs and methods that can be developed employing the teachings of the present invention. The examples provided here are illustrative and do not limit the scope of the invention, which is defined by the attached claims. For example, disclosure with respect to waveforms for encoding or representing data can apply equally well to the inverses of the waveforms used as examples.

What is claimed is:

1. A system for measuring distance between an RFID tag and an RFID tag reader and mitigating detrimental effects of noise, clutter and multi-path signals, comprising:
    an RFID reader;
    an RFID tag; and
    a pulsed radar system coordinated with said RFID reader
    wherein said RFID reader is configured to cause said tag to respond to received signals in a first backscatter state at a first time and a second backscatter state at a second time;
    said pulsed radar system is configured to receive a signal from said RFID reader indicating said backscatter states and to transmit pulses during said backscatter states of said RFID tag, and to receive reflected pulses from said RFID tag,
    said pulsed radar system is configured to calculate a difference signal between radar signals obtained during said first and second backscatter states of the tag to obtain an uncorrupted measure of a round trip time of flight of said radar pulses between said pulse radar system and said RFID tag and to calculate the distance between the RFID tag and the RFID reader based on said round trip time of flight.

2. The system of claim 1, wherein said signals obtained during said first state are time-shifted before said calculation of said difference signal.

3. The system of claim 2, wherein said signals are time-shifted by a delay line.

4. The system of claim 1, wherein said RFID tag is a first RFID tag operating in a vicinity of a plurality of other RFID tags in range of said pulse radar system and wherein said difference signal is calculated for said first RFID tag a plurality of times and averaged to discriminate said first RFID tag from said other RFID tags.

5. The system of claim 1, wherein said RFID tag is a first RFID tag operating in a vicinity of a plurality of other RFID tags in range of said pulse radar system and said RFID reader commands said other RFID tags to be silent during the transmission by said pulse radar system to said first RFID tag.

6. The system of claim 1, wherein said pulse radar system operates at a higher bandwidth and lower power than said RFID reader.

7. The system of claim 1, wherein the coordinated pulse radar system comprises at least two parallel banks of analog to digital converters.

8. The system of claim 1, wherein the coordinated pulse radar system is a pulsed monostatic radar system.

9. The system of claim 1, wherein the coordinated pulse radar system is a pulsed bistatic radar system.

10. A method for determining the distance between an RFID tag and a tag reader and for mitigating detrimental effects of noise, clutter and multi-path signals comprising:
    determining by the tag reader a time period during which a tag will respond in a first modulation state,
    signaling by the tag reader to a pulsed radar transmitter the timing of said first modulation state,
    transmitting a first radar pulse at a first pulse time during said first modulation state time period,
    receiving from the RFID tag a signal associated with said first radar pulse,
    determining a time period during which a tag will respond in a second modulation state,
    signaling by the tag reader to said pulsed radar transmitter the timing of said second modulation state,
    transmitting a second radar pulse at a second pulse time during said second modulation state time period,
    receiving from the RFID tag a signal associated with said second radar pulse, wherein there is a time difference between said first and second radar pulses,
    calculating a difference signal between said first and second received signals wherein each received signal is referenced to the time of the radar pulse with which each signal is associated and
    identifying in said difference signal a return signal associated with said tag and
    determining the distance between the tag reader and the RFID tag based on said time difference.

11. The method of claim 10, wherein said transmitting of said first and second radar pulses is coordinated with said first and second modulation states by a clock signal produced by the RFID tag.

12. The method of claim 10, wherein said transmitting of said first and second radar pulses is coordinated with said first and second modulation states by a synchronization signal produced by the reader.

13. The method of claim 10, further comprising adjusting the time of the second received signal relative to the first received signal to minimize the amplitude of said difference signal.

14. The method of claim 10, further comprising the steps of measuring the amplitude of said first and second radar pulses and normalizing said first or second received signal based on a relationship between the measured amplitudes of said first and second radar pulses.

15. The method of claim 10, further comprising selecting a digital signal from among a plurality of analog to digital converters adapted to measure said received signals to maximize a digitized representation of amplitude of said received signals.

* * * * *